United States Patent [19]
Kihnke

[11] 3,837,469
[45] Sept. 24, 1974

[54] PRODUCT ORIENTING APPARATUS FOR PACKAGING

[75] Inventor: Lee S. Kihnke, Spring Lake, Mich.

[73] Assignee: Dake Corporation, Grand Haven, Mich.

[22] Filed: Apr. 9, 1973

[21] Appl. No.: 348,974

Related U.S. Application Data

[63] Continuation-in-part of Ser. No. 254,076, May 17, 1972.

[52] U.S. Cl............... 198/106, 198/30, 198/204
[51] Int. Cl............................................. B65g 37/00
[58] Field of Search ......... 198/33 AA, 220 BA, 76, 198/131, 33 R, 106, 30

[56] References Cited
UNITED STATES PATENTS

| | | | |
|---|---|---|---|
| 2,362,677 | 11/1944 | Stephens | 198/76 |
| 2,610,724 | 9/1952 | Dudley | 198/220 BA |
| 2,839,179 | 6/1958 | Buck | 198/131 |
| 2,980,229 | 4/1961 | Carter | 198/76 |
| 3,255,864 | 6/1966 | Oldershaw | 198/33 AA |
| 3,628,648 | 12/1971 | McClusky | 198/33 R |

*Primary Examiner*—Richard E. Aegerter
*Attorney, Agent, or Firm*—Price, Heneveld, Huizenga & Cooper

[57] ABSTRACT

Apparatus for conveying and orienting elongated articles in preparation for packaging, comprising multiple sections adapted to successively linearly space and longitudinally align in columns a plurality of said articles after they are received randomly in the first of said sections. The sections are aligned rectilinearly and comprise a surge tank and elevating conveyor; a reciprocating, vibratory conveyor which segregates the articles into columns; a conveyor having endless belts with generally V-shaped cross sections; and a final conveyor having endless flat belts. the last three conveyors being located at successively lower levels. The sections are driven at successively faster speeds to facilitate the linear spacing of the articles.

21 Claims, 14 Drawing Figures

PRODUCT ORIENTING APPARATUS FOR PACKAGING

This application is a continuation-in-part of my previously filed application entitled PACKAGING APPARATUS, ser. No. 254,076, filed May 17, 1972, the disclosure of which is incorporated by reference herein.

This invention relates to infeed apparatus for packaging and, more particularly, to infeed apparatus for conveying and orienting elongated articles in preparation for packaging.

BACKGROUND OF THE INVENTION

Continued development of product packaging apparatuses that which are especially adapted to automatically package elongated products and articles such as carrots, other produce, and the like has developed a need for more accurate orientation of such articles prior to their entry into the packaging apparatus. Packaging apparatuses such as those described in copending applications, Ser. No. 254,074 entitled PRODUCT PACKAGING APPARATUS, invented by Lee S. Kihnke, filed May 17, 1972 and Ser. No. 254,075 entitled BAG-HOLDING APPARATUS AND METHOD FOR PACKAGING invented by Lee S. Kihnke and Dewey L. Thompson, filed May 17, 1972, the disclosures of which are incorporated by reference herein and both of which are assigned to the same assignee as the present application, are two such apparatuses especially adapted to package carrots. Use of such apparatuses requires the carrots to be aligned longitudinally since they are to be received lengthwise in bags. Although the copending parent application of the present application describes one type of infeed apparatus which aligns carrots in preparation for such packaging, it has been found that the packaging efficiency of such packaging devices is greatly increased by more precisely orienting and spacing the carrots. Moreover, some prior systems have required time-consuming handling of the carrots to place them on the infeed apparatus. Such systems make the handling of carrots in bulk wherein they are oriented randomly very difficult. Additionally, the prior systems have lacked the ability to consistently and reliably orient a continuous flow of carrots without continuous maintenance and observation by human operators. Therefore, prior infeed systems have lacked the real ability to efficiently perform at high production speeds which allow the packaging apparatuses associated therewith to operate continuously and to reduce packaging costs for carrot producers.

SUMMARY OF THE INVENTION

Accordingly, it is a purpose of the present invention to provide an efficient, reliable, infeed apparatus for conveying and orienting elongated articles such as carrots and the like in preparation for packaging. The apparatus is especially adapted to linearly align the carrots in individual columns such that the carrots are oriented end to end substantially in a single file including a predetermined space between each of the carrots. When aligned in this manner, the apparatus efficiently feeds each column into a separate portion of a packaging apparatus of the type described in the copending applications mentioned above. Further, the apparatus is adapted to carry out the orientation and alignment of the carrots automatically and continuously without the intervention of human operators. The orientation proceeds from a mass of randomly oriented carrots received in bulk at one end of the infeed apparatus and finishes with the carrots segregated into discreet columns ready for deposition in the packaging apparatus.

In the preferred embodiment, the infeed apparatus comprises a four-section conveyor. The last three sections are arranged rectilinearly and at successively lower levels following the first or infeed section where the carrots are received in bulk and then deposited on the one of said three sections. Each section transfers the carrots to the next section in a cascading manner while simultaneously segregating, orienting, and spacing the carrots in separate columns. The apparatus begins with a surge tank in which carrots are dumped in bulk in a random orientation and forced against an inclined elevating conveyor via a circulating liquid. The elevating conveyor individually lifts the carrots from the tank and deposits on the next conveyor section.

The second section comprises a reciprocating, vibratory conveyor including a corrugated article support pan having a plurality of rectilinear corrugations for segregating the carrots into columns. Each pair of corrugations on the vibratory conveyor feeds a single belt on the third conveyor section including a plurality of endless belts each having a generally V-shaped cross section and being driven in a closed path. A supporting pan including a plurality of generally V-shaped corrugations each disposed under one of the generally V-shaped belts further aligns the carrots into a column along each of the belts.

The third section feeds each column of carrots onto a corresponding column on the fourth and final conveyor section comprising an endless conveyor having a plurality of flat conveyor belts. The framework of inclined guides over the fourth section maintains the carrots into their column orientation.

Each of the sections is driven via power means at successively faster speeds to increase the linear spacing between the carrots as they are transferred from section to section. Further, the final conveyor section may include flow-diverting means for preventing the carrot columns from entering a packaging apparatus at the end of the infeed conveyors described in the copending parent of this application, Ser. No. 254,076, mentioned above.

The objects, advantages, purposes and features of the invention become more apparent from a study of the following description taken in conjunction with the drawings.

DESCRIPTION OF THE PREFERRED EMBODIMENT

Figure 1:
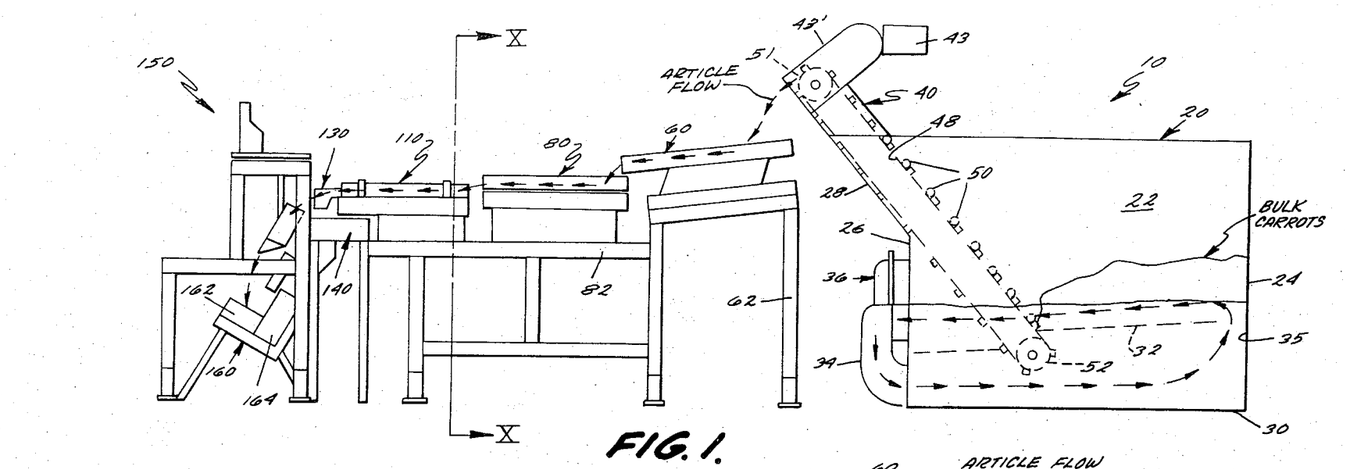
FIG. 1 is a schematic side elevation of the conveyor orienting and aligning apparatus of the present invention arranged to feed a flow of elongated articles into a packaging apparatus of the type described in the copending applications referred to above.

Referring now to FIG. 1, the preferred arrangement of the article-orienting and conveying infeed apparatus 10 is shown with the four conveying sections aligned generally rectilinearly such that the discharge end of one of the sections feeds the infeed end of the next successive section. The first section comprises a surge tank 20 including an endless, elevating conveyor 40. The elevating conveyor 40 deposits the carrots from the surge tank onto the second section comprising a reciprocating, vibratory conveyor 60. The vibratory conveyor 60 deposits the carrots in segregated columns onto the V-belt, endless conveyor section 80 which in turn deposits the carrot onto the final flat belt, endless conveyor 110. The final conveyor section 110 either transfers the columns of carrots into the packaging apparatus 150 or diverts them onto transverse conveyor 140. If transferred into packaging apparatus 150, the carrots are weighed and automatically deposited in plastic bags or the like and dropped onto a transporting conveyor 160 including two conveyors 162 and 164 disposed at right angles with one another. Conveyors 162 and 164 transport the bagged carrots transverse to the direction of flow of the infed carrots on the orienting apparatus 10. If the packaging apparatus 150 is for any reason unable to accept any more carrots, a signaling means included therein initiates the diverting action of the flow-diverting means 130 at the discharge end of the final conveyor section 110 to divert the columns of carrots onto the transverse conveyor 140. The diverted carrots may then be returned to the surge tank or returned to the main carrot-transporting line in accordance with the desires of the individual packer. Thus, the use of the present orienting and conveying infeed apparatus with the packaging apparatus of the type described in the copending applications referred to above, allows randomly oriented, bulk carrots to be transferred and packaged reliably and efficiently without the intervention of human operators.

Figure 2:
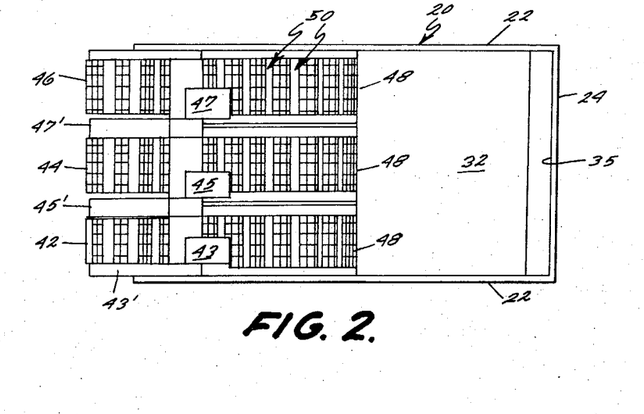
FIG. 2 is a plan view of the surge tank and elevating conveyors comprising the first section of the conveyor apparatus.
Figure 10:
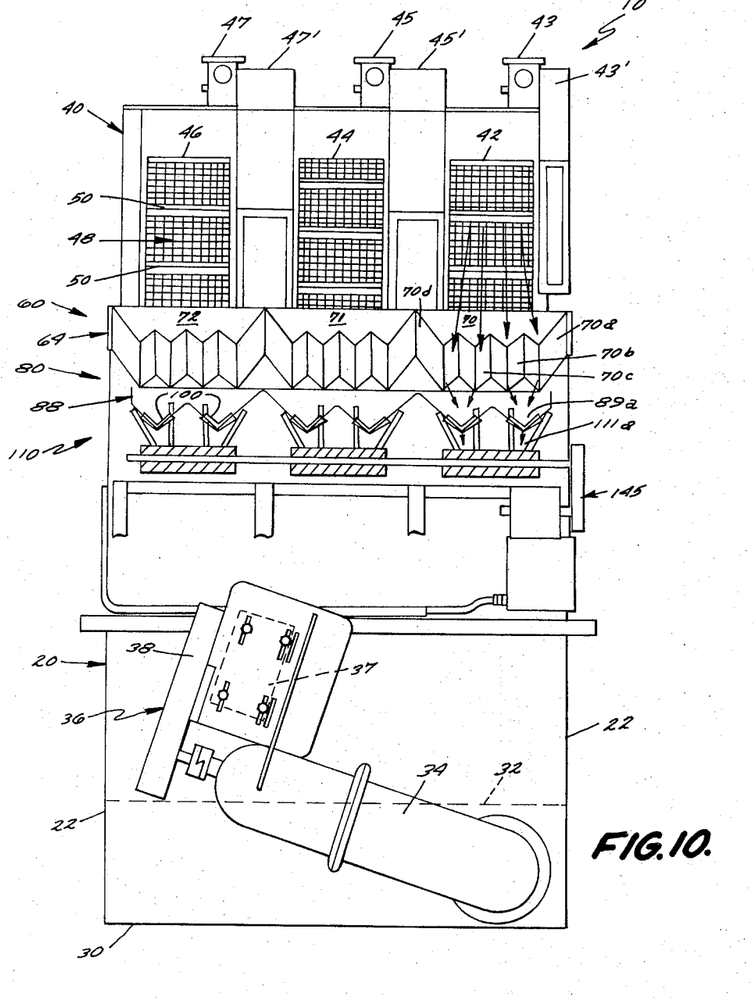
FIG. 10 is a cross-sectional, end elevation of the four sections comprising the conveyor apparatus of the present invention taken along plane X—X of FIG. 1.

As soon in FIGS. 1, 2, and 10, the surge tank 20 comprises a generally rectangular, liquid-tight tank having side walls 22, a generally vertical end wall 24, and an opposite end wall 26 including an inclined portion 28 which receives the inclined elevating conveyors 40. The tank also includes a permanent floor 30 and a partition 32 suspended a predetermined distance above the permanent floor 30. As shown in FIG. 1, the tank is adapted to receive a quantity of liquid, normally water, up to a level approximately at the height of the entrance 33 to a recirculating conduit 34 affixed to end wall 26. As shown in FIG. 10, the water is circulated through conduit 34 via a power pump assembly 36 including an electric motor 37, a belt or chain drive 38, and a shaft 39 which drives an impeller within the conduit 34. As shown in FIG. 1, this water-circulating assembly is adapted to produce a flow of water along the top of the partition 32 through the chain-link belts of endless conveyor 40, into and through the reversing conduit 34, along the bottom of the tank over the permanent floor 30 and upwardly through an aperture 35 between the edge of false floor 32 and end wall 24. A load of bulk carrots (FIG. 1), which preferably have been previously sorted or graded approximately as to size, may be dumped into the tank 20 such that they rest on the partition 32 between the inclined conveyors 40 and the end wall 24. As the water is circulated in the closed path described above, the force of the water along the top of the partition 32 forces the carrots against the conveyors 40 which lift the carrots from the tank and deposit them on the reciprocating, vibratory conveyor section 60 as shown in FIG. 1.

The inclined elevating conveyors 40 comprise three parallel, endless conveyor sections, 42, 44, and 46 spaced transversely across the inclined section 28 of the end wall 26 as shown in FIG. 2. Each of the separate conveyors 42 through 46 includes a variable speed electric motor and associated belt or chain drive means 43 and 43', 45 and 45', and 47 and 47'; respectively. The conveyor sections extend from the position slightly below the level of the partition 32 within the tank 20 to a position vertically above the top edge of wall portion 28. Each section comprises an endless belt or grid 48 including a plurality of generally horizontal slats or carrot-supporting members 50 spaced evenly therealong. The belt 48 is supported on the driving rollers or wheels 51 and supporting rollers or wheels 52 at either end of the conveyor sections. It is an open grid-type belt which allows the circulating water in the tand 20 to pass freely therethrough. Preferably, the grids are formed from non-corrosive metallic materials which will withstand exposure to water over prolonged periods. Each of the slats or supporting members 50 may be formed from wood or another material and extends normally from the surface of the grid belt 48 a sufficient distance to support at least one or more carrots generally horizontally therealong. Therefore, as the water is circulated through the tank 20 in the manner described above, randomly oriented carrots are forced by the water passing through the conveyor grids against the three conveyors with the supporting members or slats 50 each lifting one or more carrots out of the tank and depositing them onto the supporting surface of the reciprocating, vibratory conveyor 60. Tank 20 is positioned such that the discharge end of the conveyors 42–46 extends vertically over the infeed end of the vibratory conveyor section 60 as shown in FIG. 1. Thus, the motion of the carrots on conveyors 42–46 carries them in an arcuate path away from the end of those conveyors and onto the surface of vibratory conveyor 60.

Figure 3:
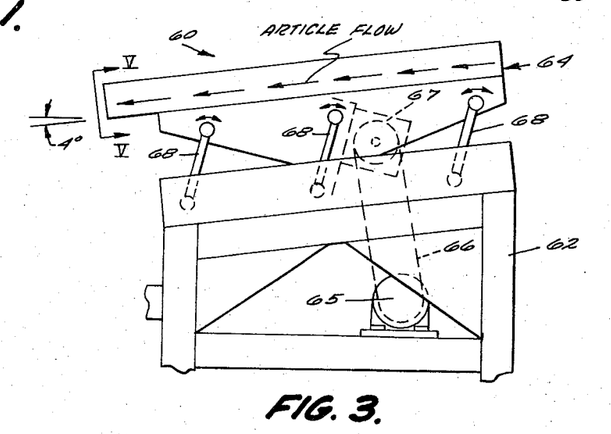
FIG. 3 is a fragmentary, side elevation of the reciprocating, vibratory conveyor comprising the second section of the conveyor apparatus.

As shown in FIGS. 1 and 3–5, the oscillating vibratory conveyor 60 is positioned on a supporting framework 62 such that its article-supporting and transferring pan 64 extends substantially rectilinearly from beneath the conveyors 40 to a position vertically above the infeed end of the third or V-belt endless conveyor section 80. Conveyor 60 is of the type which includes a motor 65 connected by a belt 66 to a rotatably mounted, eccentric weight 67. The weight 67 has a predetermined configuration which imparts extremely rapid, short-stroke, oscillatory movement to the article-support pan 64 as a result of the pivotal mounts 68. The rapid oscillatory movement of the pan moves the articles supported thereon in short increments along the surface thereof toward the third conveyor section 80. In actuality, the pan is advanced relatively slowly toward section 80 in one stroke and then is retracted extremely rapidly. During retraction, the inertial mass of the articles maintains them in their advanced position as the pan is rapidly retracted beneath them. This movement along the support pan 64 may be accomplished when the pan is exactly horizontal or may be facilitated by tipping the pan slightly downwardly as shown in FIGS. 1 and 3. Although a range of inclinations may be used, it has been found that an angle of approximately 4° is preferable with the present apparatus (FIG. 3).

Figure 4:
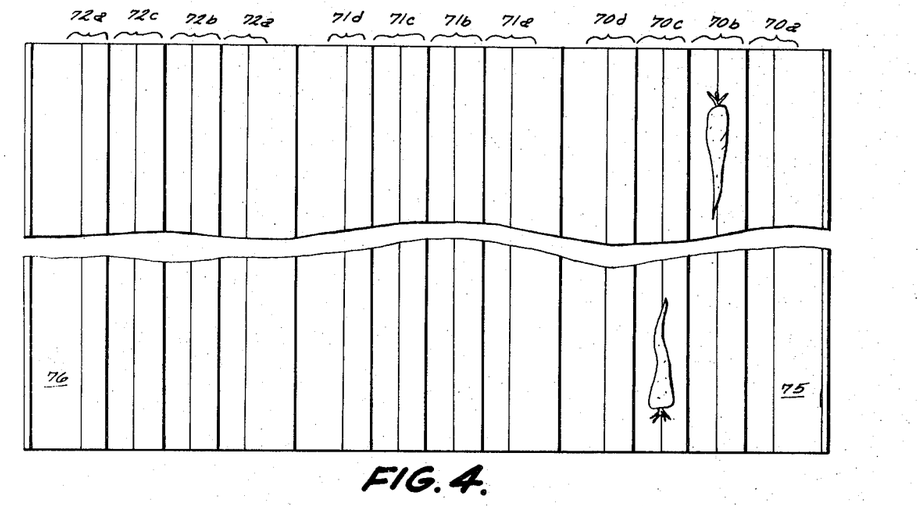
FIG. 4 is a broken, plan view of the article carrying pan of the reciprocating, vibratory conveyor shown in FIG. 3.
Figure 5:
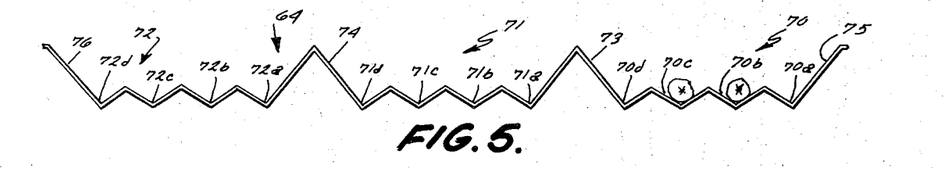
FIG. 5 is an end view of the article-carrying pan of the reciprocating, vibratory conveyor taken along plane V—V of FIG. 3.

As shown in FIGS. 4 and 5, the article supporting pan 64 includes a plurality of substantially parallel corrugations extending in the direction of flow of the articles over the pan. The corrugations are spaced laterally across the width of the pan in a direction transverse to the flow of articles thereon. The pan corrugations are divided into three rows or channels 70, 71, and 72. Each row 70–72 is in turn divided into four columns or troughs 70a through 70d, 71a through 71d, and 72a through 72d. The rows are separated by dividers 73 and 74 each having the general shape of an inverted "V," the apex thereof extending generally upwardly and the inclined side walls thereof extending downwardly into the adjacent columns. Each of the columns or troughs in turn has the shape of a generally upright "V" with the apex thereof extending downwardly and the inclined side walls extending generally upwardly at an angle and joining one another in upwardly extending apexes which divide the various columns. The apexes of dividers 73 and 74 extend substantially higher than the apexes of the adjacent columns. Inclined side walls 75 and 76 on the extreme edges of the supporting pan extend upwardly as far as divider 73 and 74 and direct the elongated articles into the columns in the rows 70 and 72 adjacent the edges of the pan. Pan 64 is preferably made from stainless steel or another non-corrosive sanitary material having a smooth surface allowing the carrots to slide readily therealong.

As is best seen in FIGS. 1 and 10, each of the inclined elevating conveyors 40–44 included in surge tank 20 feeds carrots into only one of the rows or channels 70–72, respectively, of article-supporting and transferring pan 64. Dividers 73 and 74 keep the carrots in these rows. Once the carrots have fallen into a row, the apexes of the adjacent troughs 70a–d, etc., force the carrots to fall or roll into the various troughs with the inclined side walls thereof aligning them generally longitudinally substantially parallel to the longitudinal axes of the elongated articles. Accordingly, the supporting pan aligns the elongated articles generally end to end in tandem as they are moved therealong by the vibratory, reciprocal movement of the conveyor 60. In the preferred embodiment, the combination of the vibratory movement of conveyor 60 and the inclination of support pan 62 at approximately 4° moves the elongated articles therealong at approximately 70 feet per minute.

As shown in FIGS. 1 and 6–8, the third conveyor section is disposed substantially horizontally from a position adjacent and under the discharge end of the vibratory conveyor 60 to a position slightly above and adjacent the infeed end of the final conveyor section 110. V-belt conveyor 80 is supported by a framework 82 and includes six endless conveyor belts 100 having generally V-shaped cross sections spaced across its width. The belts are supported at either end of their closed loop paths by pulley wheels 84 which in turn are mounted on axles 85 rotatably mounted at either end of the conveyor on suitable bearings. One of the axles 85 is in turn driven by an electric motor, gear-reducing, and chain drive means 86. In the preferred embodiment, each of the "V" belts 100 on conveyor 80 is driven at approximately 400 feet per minute.

Figure 6:
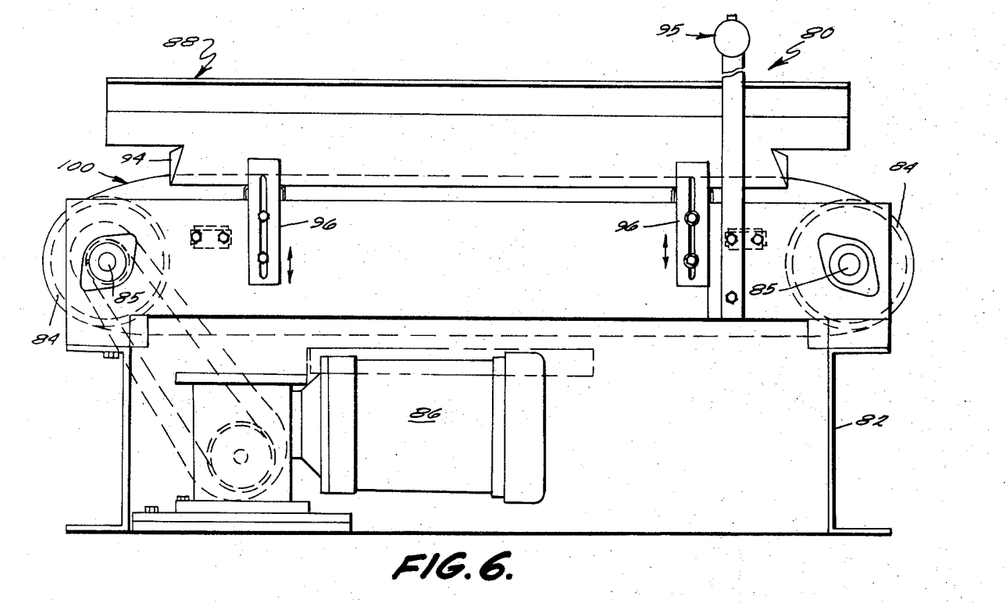
FIG. 6 is a side elevation of the endless V-belt conveyor comprising the third section of the conveyor apparatus.
Figure 7:
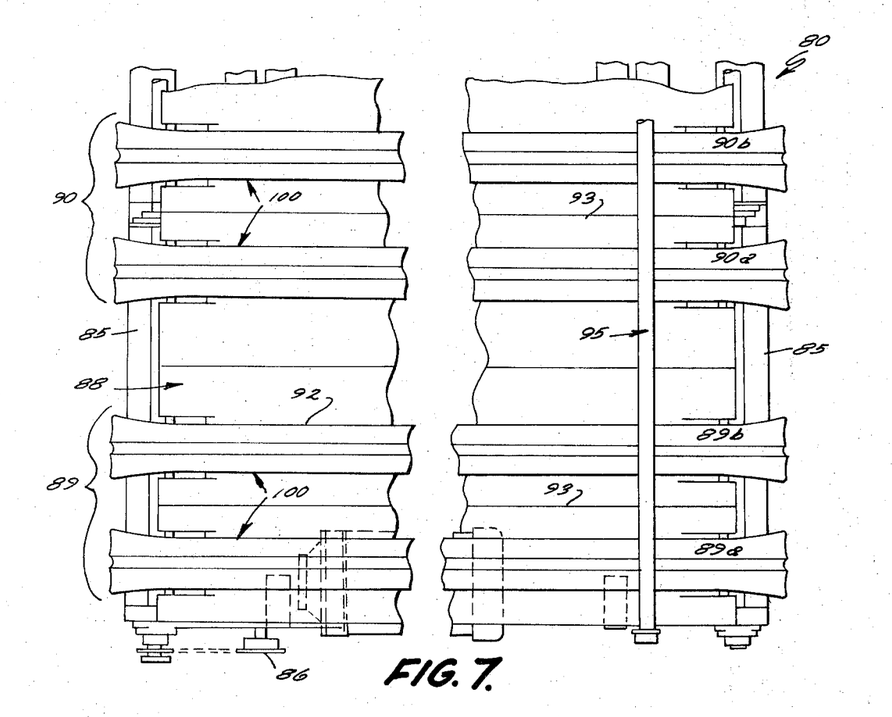
FIG. 7 is a fragmentary, broken, plan view of the endless V-belt conveyor shown in FIG. 6.
Figure 8:
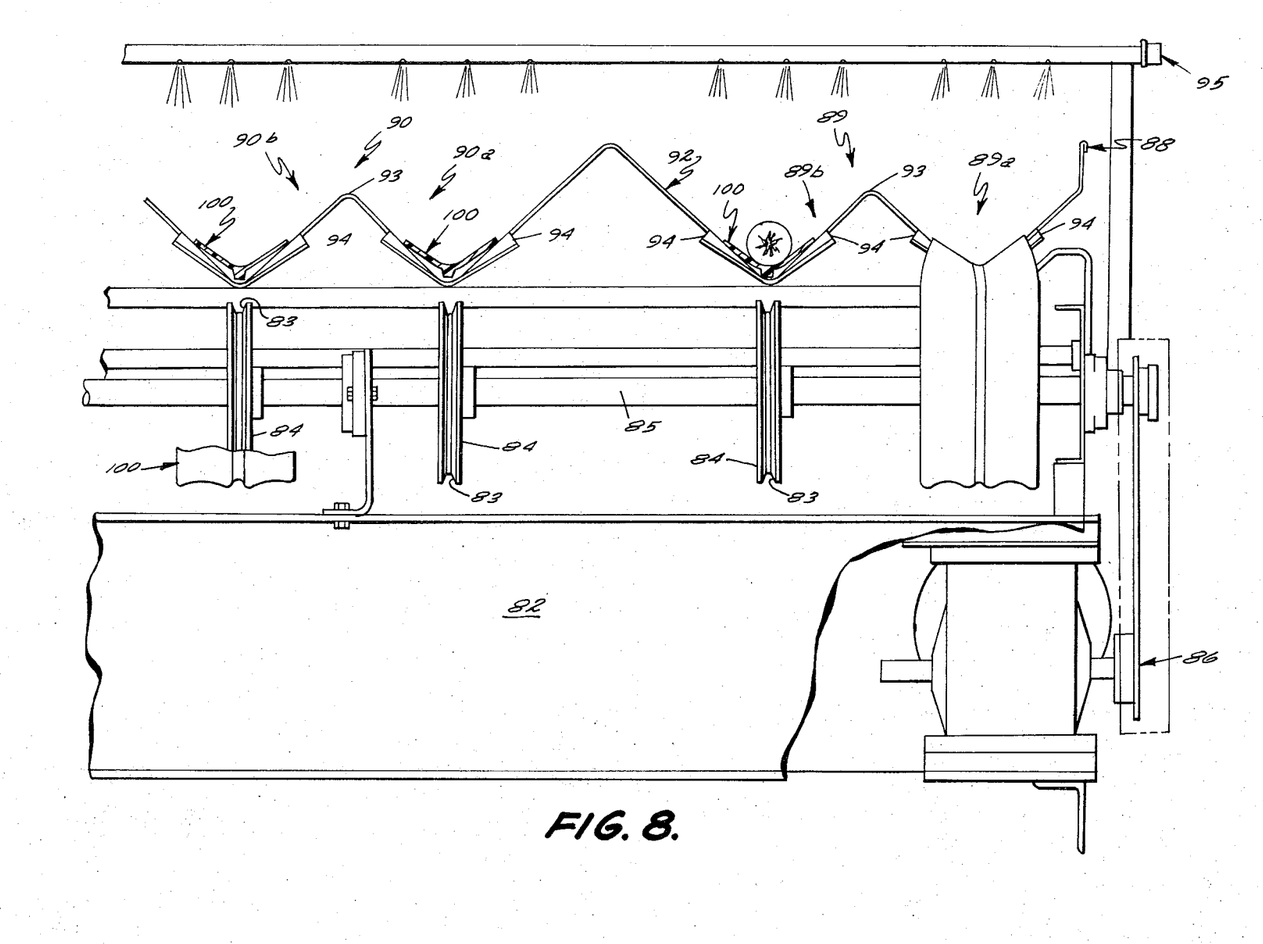
FIG. 8 is a fragmentary, end view of the endless V-belt conveyor section shown in FIGS. 6 and 7.

A supporting bed for supporting the belts in their generally V-shaped cross-sectional shape in the upper portion of their paths in which they are supporting the columns of elongated articles is provided by a corrugated support pan 88. Pan 88 has a number of generally upright V-shaped cross-sectional areas supporting the belts between the ends of the conveyor. The support pan 88 is divided into three rows 89, 90, and 91 (not shown), each of the rows in turn being divided into two columns or troughs 89a and 89b, 90a and 90b and 91a and 91b (not shown) by the corrugations of the pan. The rows are separated by dividers 92 having generally V-shaped cross-sectional shapes with their apexes extending upwardly such that elongated articles fall or slide to either side thereof. The troughs in turn have upwardly inclined walls joining one another in apexes extending generally upwardly but only to a level below that of the apexes of dividers 92. Accordingly, the inclined walls of the dividers and columns force the columns of carrots or other elongated articles, which are received from the vibratory conveyor 60, to remain in their substantially longitudinally aligned, tandem orientation by forcing the carrots to roll or slide down the inclined walls to the bottom of the "V" belts 100 which carry then along conveyor 80.

The ends 94 of each column or trough of supporting pan 88 are turned downwardly as shown in FIGS. 6 and 8 to prevent tearing or excess wearing of the underside of the belts 100 as they travel thereover. Further, to prevent wear along the surfaces of the troughs of supporting pan 88, water-spraying apparatus 95 is supported over the pan 88 adjacent the infeed end thereof. As shown in FIG. 8, water is sprayed into each trough and flows underneath the belt to provide lubrication between the belt and the pan. The pan 88 is preferably made from stainless steel or other corrosive resistant material in order to resist the prolonged, corrosive effects of the water thereon.

As shown in FIGS. 7 and 8, the belt retains its generally V-shaped configuration while supporting and carrying the elongated articles such as the carrots but is substantially flattened as it is driven around the pulley wheels 84. As will be more fully explained below, the belt includes inherent resiliency and memory such that it returns to its general "V" shape when it travels over supporting pan 88. In order to adjust the tension on belts 100, the entire supporting pan 88 is vertically adjustable via slotted supporting brackets 96 (FIG. 6). Thus, a belt may be inserted around pulley wheels 84 by lowering supporting pan 86 to relieve the tension thereon after which the pan may be raised to return the belts to their operating tensions.

Figure 9:
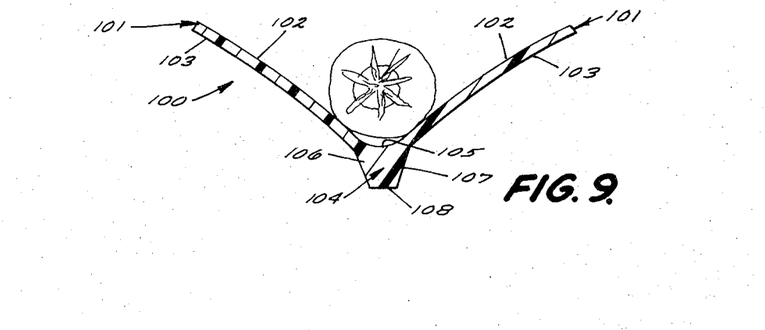
FIG. 9 is a cross-sectional view of the generally V-shaped, endless conveyor belt utilized on the third conveyor section shown in FIGS. 6–8.

As shown in FIGS. 8 and 9, the generally V-shaped conveyor belt of the third conveyor section 80 includes two inclined, generally planar sides 101 joined by an integral medial section 104. Although sides 101 are generally planar, when unsupported the outer ends tend to droop or fall somewhat giving each side a slightly arcuate cross-sectional shape. Thus, unsupported, inside surface 102 is slightly convex while external surface 103 is slightly concave. The inside surfaces 102 of the sides 101 are joined by the rounded, contoured top 105 of the medial section 104. Portion 105 provides a rounded area which approximately corresponds to that of the exterior of a carrot or other elongated cylindrical object such that the carrots or objects are stably supported therein (see FIG. 9). The medial section 104 has an overall wedge shape including tapered sides 106 and 107 ending in a truncated, generally flat bottom 108. The shape of the medial section, which extends beyond and below the plane of the edges of the two sides 101 joined thereby, approximately corresponds to the cross-sectional shape of the annular slot or receptacle 83 in each of the pulley wheels 84 (see FIG. 8). Thus, medial section 104 is securely gripped by the slot in the pulley wheel for positive driving action through its closed path. As shown in FIG. 8, the belt is adapted to contact the supporting pan 88 in only three areas when loaded, i.e., on flat bottom 107 and on the exterior surfaces 103 of sides 101 at the ends thereof. This three-point contact, when facilitated by the lubrication of the sprayed water from apparatus 95, provides minimal frictional resistance of the belt along the supporting pan 88.

Belts 100 are formed from an extruded thermoplastic material such as extruded polyurethane. As mentioned above, such material retains an inherent resiliency and memory such that it always tends to revert back to its generally "V" cross-sectional shape. Further, this material is extremely strong as well as being tear and abrasion resistant. The belt is formed into a closed loop by joining two ends of a length thereof at one butt joint, the ends being joined by suitable adhesives, with mechanical connectors or other securing means.

As shown in FIGS. 1 and 11–13, fourth and final conveyor section 110 comprises a flat belt, endless conveyor extending substantially horizontally between the discharge end of V-belt conveyor 80 and packaging apparatus 150. The conveyor 110 is positioned at a level slightly below that of conveyor 80 via a supporting framework which may be the same as framework 82 for conveyor 80. Conveyor 110 includes three conveyor rows or channels 111, 112, and 112 (the latter of which is not shown in FIG. 11) spaced across the width thereof, each comprising a substantially flat, flexible, conveyor belt 114 traveling in a closed path and supported via rollers 115 at either end thereof. At the infeed end of conveyor 110, rollers 115 are supported on separate axles 116 while at the discharge end the rollers 115 are supported on a continuous axle 117 comprising separate axle sections 118 connected by couplers 118. The separate axles at the infeed end allow adjustment on the tension on the belts via movement fo the rollers and axles toward the infeed end of the conveyor. The flat belts are supported over the upper portion of their closed loop paths when they support the elongated articles on conveyor 110 by substantially planar plate members 119 extending thereunder. The rollers 114 at the discharge end are driven by an electric motor, gear-reducing and chain drive means 120 similar to that used for driving the "V" belts of conveyor section 80 as described above. In the preferred embodiment, each of the flat belts 114 on conveyor 110 is driven at approximately 500 feet per minute.

Figure 11:
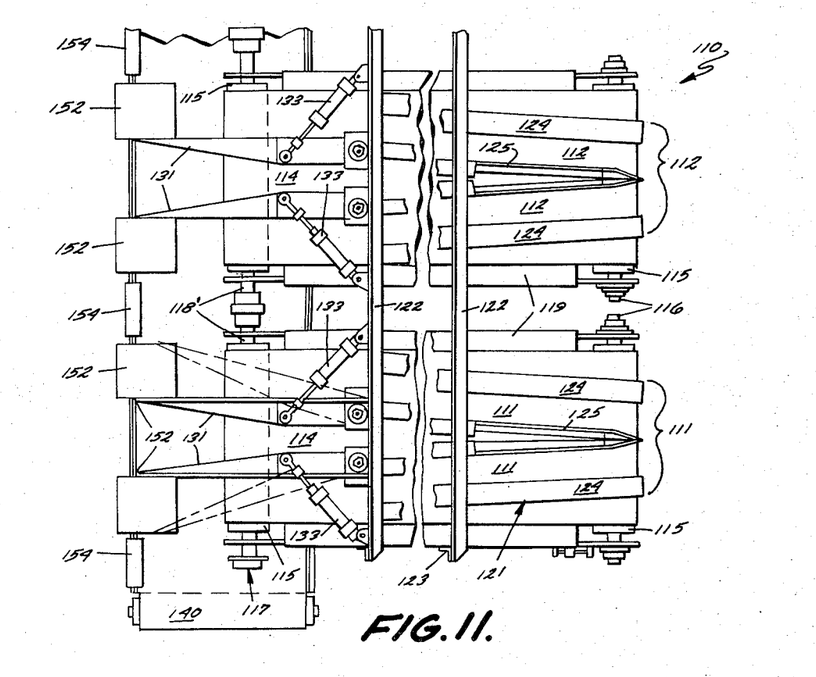
FIG. 11 is a fragmentary, broken plan view of the final conveyor section including flow-diverting means, a transverse conveyor thereunder, and a portion of a packaging apparatus into which the carrots are deposited by the present invention.
Figure 12:
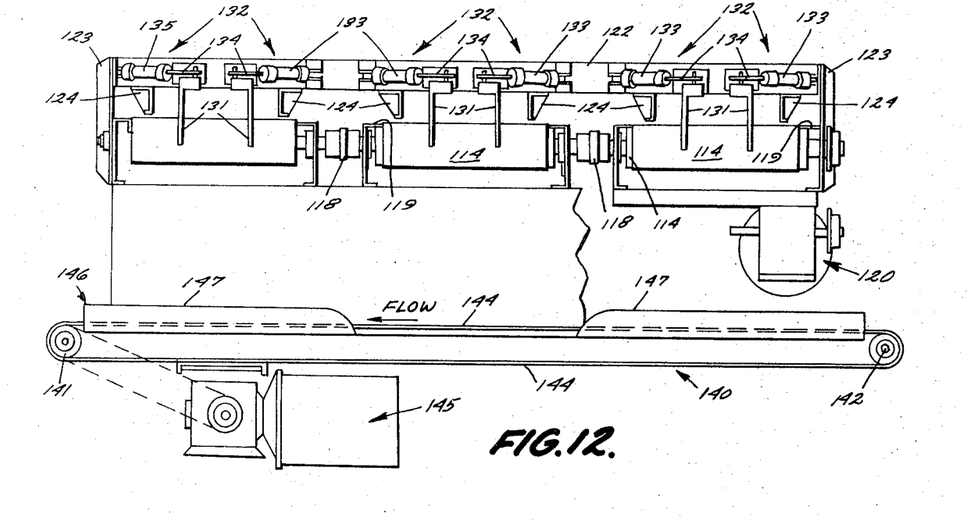
FIG. 12 is an end elevation of the final conveyor section shown in FIG. 11 including the transverse conveyor with portions broken away.
Figure 13:
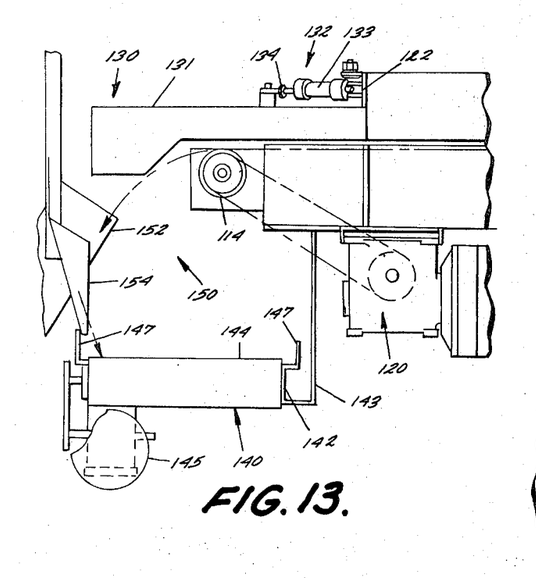
FIG. 13 is a fragmentary, enlarged side elevation of the end area of the final section shown in FIGS. 11 and 12 and a portion of a packaging apparatus as shown in FIG. 11.

Dividing the flow of articles or materials carried by conveyor section 110 into a plurality of columns or troughs 111a and 111b, 112a and 112b and 113a and 113b (the latter two columns not being shown in FIG. 11) is a guide means 121 as seen in FIGS. 11–13. Belts 114 are driven beneath these guides as illustrated. Each of the rows 89a and 89b, etc., of the V-belt conveyor section 80 feeds one of the columns or troughs 111a and 111b, etc., of conveyor section 110. Thus, the carrots remain in their tandem orientation on conveyor 110. Guide means 121 includes cross members 122 and upstanding support members 123. These members support the inclined side walls 124 and V-shaped islands 125 having inclined side walls, which side walls and islands define the columns "a" and "b" on the respective conveyor rows 111–113. Side walls 124 and islands 125 further segregate the flow of articles or material transported by conveyor 110 and direct the flow divergently toward the discharge end thereof. As the flow of elongated articles approaches the discharge end, the flow will be directed either into the packaging apparatus 150 including a plurality of bucket receptacles 152 as defined in the copending application referred to above and incorporated by reference herein Ser. No. 254,074, or will be directed by a flow-diverting means 130 against deflection plates 154 which direct the columns of carrots onto a transverse conveyor 140 (see FIGS. 1, 11, and 13).

Referring now to FIGS. 11–13, the flowdiverting apparatus 130 comprises a plurality of pivotal extensions or gates 131 which extend from and are pivotally mounted on the spaced ends of V-shaped flow-directing islands 125. Pivotal extensions or gates 131 are driven by flow-diverting power units 132 which comprise a plurality of compressed air cylinders 133 including movable extensible and retractable shafts 134. Cylinders 133 are pivotally mounted between gates 131 and the cross member 122 nearest the discharge end of conveyor 110 as shown in FIG. 11. Cylinders 133 operate in response to a predetermined signal from packaging apparatus 150 to extend or retract shaft 134 causing gates 131 to pivot across the columns of elongated articles flowing along conveyor 110, thereby diverting the flow of the columns either onto the transverse conveyor 140 or allowing the flow to continue on to the packaging apparatus 150 and buckets 152. A predetermined signal is supplied by a pneumatic signaling means (see FIG. 14) included in a scale or weighing means associated with each bucket 152 of the packaging apparatus 150. This signal indicates that the hoppers or buckets 152 included with the packaging apparatus are full or clogged and cannot accept any more of the conveyed elongated articles. Upon this condition, the signal is given by the signaling means via a pneumatic logic circuit and the compressed air cylinders 133 are activated to pivot gates 131 across the flow on conveyor 110 to the position shown by the phantom lines in FIG. 14. As described in copending application Ser. No. 254,074 referred to above, the activation of this signaling means may occur from other sources such as when the bag-holding apparatus incorporated in the packaging apparatus is empty. In this diverted position, gates 131 will divert the flow of articles against deflection plates 154 causing the flow to fall onto the transverse conveyor 140 as shown by the dotted arrows in FIGS. 13 and 14.

Figure 14:
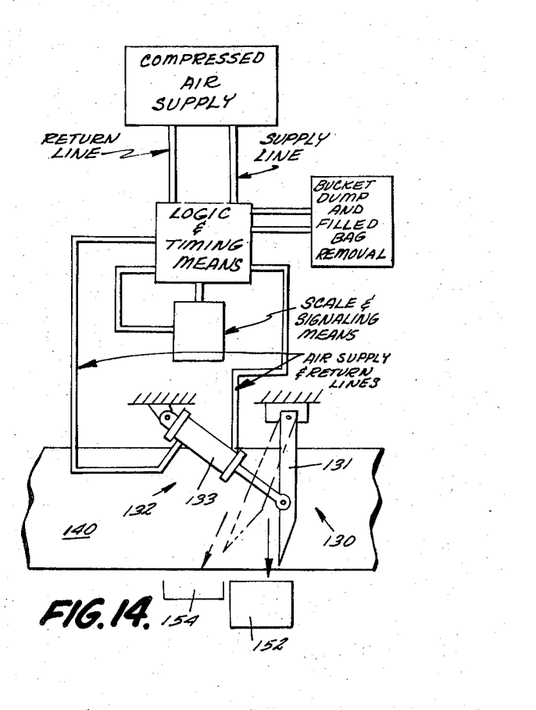
FIG. 14 is a schematic drawing of the pneumatic means and control means operably associated with the flow-diverting means on the final conveyor section.

When no signal has been given by the logic and signaling means, e.g., when the hoppers or buckets are not filled or clogged or when a sufficient supply of packaging bags remains in the packaging apparatus, the gates 131 are allowed to remain in the unpivoted position shown by the solid lines in FIGS. 13 and 14 thereby allowing the flow of articles to fall directly into the buckets or hoppers 152 of the packaging apparatus 150, as shown by the solid arrows in FIG. 14.

The signal which diverts gates 131 also initiates pneumatic bucket dump and filled bag removal apparatus in packager 150 (FIG. 14). Pneumatic timing means included in the logic circuit control these various filling and bagging operations after which the logic unit initiates the return of gates 131 via cylinders 133 to their unpivoted, starting or filling positions. Thus, the flow-diverting apparatus, powered by the flow-diverting power units 132, provides an automatic control assembly for diverting the flow of articles on conveyor 110 into the transverse conveyor 140. Such automatic diversion prevents any jam-ups on the conveyor or in the infeed apparatus 10 and also allows the continuous operation of the conveyor apparatus without allowing any waste or spillage of the transported articles or material.

The transverse conveyor 140 comprises a single conveyor having a substantially flat, endless belt and including a drive roller 141 and a supporting roller 142 which are mounted on a frame 143 extending below and between the discharge end of conveyor 110 and packaging means 150 (FIGS. 12 and 13). Drive roller 141 drives the endless flexible belt 144 by means of a motor, reduction gear box and chain drive assembly 145. The flow of material on transverse conveyor 140 is supported and guided on belt 144 via a support channel 146 having channel side walls 147 which confine the flow of articles to the desired course. As shown in these figures, the transverse conveyor 140 is mounted across or transverse to the direction of flow on conveyor section 110 such that articles or material directed onto the conveyor by gates 131 will be transported away from conveyor 110. The redirected carrots or articles may then be transported or taken back to surge tank 20 or diverted into another carrot-packaging or infeed apparatus.

Referring now to FIG. 10, the operation of the combined conveying and orienting infeed apparatus 10 will be understood. The randomly oriented carrots or other elongated articles are elevated out of surge tank 20 via inclined endless conveyors 42–46 and deposited in the rows or channels 70–72 of the vibratory conveyor 60. The individual, generally V-shaped columns or troughs of these rows generally segregate and orient the elongated articles into a generally tandem or column-like, end-to-end arrangement. Each side-by-side pair of the columns or troughs on the supporting pan 64 on conveyor 60 feeds one column or trough on V-belt endless conveyor 80. For example, column 70a and 70b feed column 89a on conveyor 80. Subsequently, each of the columns on conveyor 80 feeds a corresponding column on the final conveyor section 110. For example, column 89a feeds column 111a on conveyor 110.

Each of the final three conveyor sections 60, 80, and 110 conveys the elongated articles or carrots at a successively faster speed than the next previous section. Thus, conveyor 60 transfers the carrots at approximately 70 feet per minute, conveyor 80 at approximately 400 feet per minute, and conveyor 110 at approximately 500 feet per minute in the preferred embodiment. This successively increasing speed helps to orient and prevent jamming of the carrots on the conveying apparatus as well as increasing the linear spacing between the carrots as they are conveyed from section to section. The increased spacing facilitates the packaging efficiency in apparatuses such as that shown at 150 and described above. Moreover, each of the conveyor sections is positioned at a successively lower vertical level than the next previous section such that the carrots flow therealong in a downwardly cascading manner further preventing a jam-up or clogging of the carrots between the sections.

Accordingly, it will be understood that the conveying and orienting infeed apparatus 10 conveys and orients elongated articles such as carrots and other produce efficiently and reliably without intervention of human operators. The carrots are transferred from a randomly oriented bulk mass and segregated into discreet columns along the length of the conveyor by the various conveyor sections so that they may be efficiently transferred and deposited in the packaging apparatus at the end of the conveying apparatus. The orientation of the elongated carrots thus occurs in progressive steps along the entire length of the combined apparatus in a manner which ultimately enables the more efficient packaging of the carrots with much fewer breakdowns and much less down time than has been encountered with previous packaging devices.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow.

The embodiments of the invention in which an exclusive property or privilege is claimed are defined as follows:

1. Apparatus for conveying and orienting elongated articles in preparation for packaging comprising means for successively transferring such articles along a path including means for receiving and holding a plurality of said elongated articles in a randomly oriented fashion;

oscillating means for linearly spacing and orienting said elongated articles, means for depositing said elongated articles from said receiving and holding means on said oscillating means at a predetermined speed; said oscillating means including a vibratory conveyor having an article-support and transferring pan and means for imparting an oscillatory vibration of said pan for movement of said elongated articles therealong; said pan including means for randomly receiving, segregating, spacing, and aligning said elongated articles in at least a pair of discrete, linearly oriented columns of flow, said depositing means having means for feeding elongated articles onto said oscillating means at locations along at least said pair of said columns, said aligning means on said pan including means for aligning said elongated articles in each of said columns with the longitudinal axes of said articles being generally parallel to the direction of movement of said articles on said pan; and additional conveyor means for linearly spacing and orienting said articles, said additional conveyor means being positioned to receive said elongated articles from said oscillating means and including means for conveying elongated articles in tandem in at least one column, and means for merging articles from both of said columns in said pair into a single column in which said articles are generally in tandem and aligned with their longitudinal axes generally parallel to the direction of movement on the additional conveyor means and for maintaining said articles in such a column whereby the elongated articles are fed onto the one column of said additional conveying means to maintain an approximately constant volume of flow in said column on said additional conveying means; and means for controlling said oscillating means and said additional conveyor means to operate at speeds successively faster than said depositing means for successively spacing said elongated articles longitudinally apart as they pass from one portion of the conveying apparatus to the next.

2. The apparatus of claim 1 wherein said means for depositing said articles on said oscillating means includes elevator means for elevating said articles from said receiving and holding means and dropping said articles on said reciprocating means.

3. The apparatus of claim 2 wherein said article support and transferring pan is located at a vertical level generally intermediate the level of the uppermost portion of said elevator means and the level of said additional conveyor means.

4. The apparatus of claim 3 wherein said pan includes a plurality of substantially parallel corrugations extending in the direction of flow of said articles over said support pan; sid corrugations having inclined walls defining troughs extending parallel to each other for guiding the flow of articles on said pan to provide said columns of flow on said support pan.

5. The apparatus of claim 3 wherein said additional conveyor means includes two endless conveyor sections, the first section being positioned to receive said articles from said support pan and the second being positioned to receive said articles from said first section; said first section being located at a vertical level intermediate the level of said support pan and the level of the second of said endless conveyor sections.

6. The apparatus of claim 5 wherein said elevator means, support pan, and said two endless conveyor sections are arranged linearly for successively receiving said articles; said controlling means including means for controlling said means for elevating and dropping said articles on said oscillating means to operate at the slowest speed and said second endless conveyor section to operate at the highest speed.

7. The apparatus of claim 2 wherein said means for receiving and holding said articles and said elevator means comprise a liquid-tight tank having sides, a floor, a partition spaced above said floor, at least one vertically inclined, endless conveyor extending from a position adjacent said partition over an upper edge of said sides and having a plurality of substantially horizontal supports for engaging and supporting said elongated articles, and means for circulating liquid over said partition, through said conveyor and back between said partition and floor in a closed path within said tank; whereby said tank is adapted to receive a plurality of said elongated articles in liquid, and said circulating means circulate said liquid such that said articles are forced against said conveyor for elevation out of said tank via said horizontal supports.

8. The apparatus of claim 1 wherein said support pan extends at a downward angle between said means for depositing said articles on said oscillating means and said additional conveyor means; said pan including an end adjacent said additional conveyor means which is the vertically lowest portion of said pan.

9. The apparatus of claim 1 which is adapted to transfer said articles into an article-packaging apparatus, said additional conveyor means including means for diverting and preventing a flow of articles along said conveyor from being transferred into such an article-packaging apparatus in response to a predetermined condition of the packaging apparatus.

10. The apparatus of claim 9 wherein said additional conveyor means comprises an endless conveyor means including at least two endless conveyor sections, the second of said endless conveyor sections being positioned to receive said elongated articles from the first of said endless conveyor sections and being adapted to transfer said articles into an article-packaging apparatus; said second endless conveyor section including said means for diverting and preventing a flow of articles along said conveyor from being transferred into an article-packaging apparatus in response to a predetermined condition of said packaging apparatus.

11. The apparatus of claim 9 wherein said additional conveyor means comprises an endless conveyor means including at least two endless conveyor sections, the first of said sections including said means for conveying elongated articles in tandem which includes at least one endless belt having a V-shaped cross section and means for supporting and driving said belt in a closed path; said belt being adapted to linearly orient a continuous flow of said elongated articles in tandem in a column; said column of linearly oriented articles being deposited in said tandem orientation by said belt on the second of said endless conveyor sections; said second conveyor section including means for maintaining said articles in said tandem alignment and for depositing said aligned articles into a packaging apparatus.

12. The apparatus of claim 1 wherein said means for conveying said elongated articles in tandem comprises an endless conveyor means including at least one endless belt having a V-shaped cross section and means for supporting and driving said belt in a closed path; said belt adapted to receive, merge, and linearly orient a continuous flow of said elongated articles from said pair of columns in tandem in a column.

13. The apparatus of claim 12 wherein said means for merging and maintaining said articles in tandem in a column include a supporting pan having a V-shaped cross-sectional area beneath said belt along at least a portion of said closed path; means for spraying a lubricating liquid between said belt and said supporting pan; and means for raising and lowering said pan with respect to said belt for adjustment of the tension on said belt.

14. Apparatus for conveying and orienting elongated articles for packaging wherein a plurality of said articles are longitudinally spaced apart and oriented with respect to their longitudinal axes in preparation for packaging by transferring said articles through successive conveying sections arranged rectilinearly; said apparatus comprising a first section including a tank for holding and receiving a plurality of said articles in a randomly oriented fashion; a first conveyor in said tank for transporting said articles out of said tank and randomly depositing said articles on another conveyor; and means for circulating a liquid through said conveyor to force said articles onto said first conveyor; a second section arranged to receive articles from said first conveyor, said second section including an oscillating, vibratory conveyor having a corrugated support pan adapted to segregate said articles into discrete, parallel columns, each corrugation in said pan defining one of said columns, wherein said articles are arranged in tandem with their their longitudinal axes aligned generally parallel to the direction of movement of said articles on said pan; a third section arranged to receive articles from said oscillating, vibratory conveyor and including a plurality of channels each having a generally V-shaped cross section, an endless belt in each of said channels for carrying said articles through said channels, and means for supporting and driving said belt in a closed path; each pair of corrugations defining said columns on said oscillating vibratory conveyor including means for feeding one channel and belt on said third section; and means for merging the articles flowing in each of said pairs of corrugations defining said discrete columns into single columns on said belt.

15. The apparatus of claim 14 wherein said second and third sections are each located at a vertical level below the next preceding section such that said articles cascade downwardly from one section to the next as they are conveyed therealong.

16. The apparatus of claim 14 wherein said first section includes means for driving said first conveyor at a predetermined speed; said second and third sections including means for conveying said articles at successively faster speeds whereby the longitudinal spacing between said articles is successively increased as said articles are conveyed from section to section.

17. The apparatus of claim 16 wherein said tank includes three of said conveyors arranged generally parallel to and side by side with one another, each of said conveyors in said tank adapted to feed articles from said tank to one set of corrugations on said support pan; said support pan including three sets of corrugations spaced side by side, each set of corrugations including two pairs of side-by-side, parallel corrugations, and a divider member between each of said sets and on the outside edge of each of said corrugations on the outside edges of said pan, said dividers adapted to prevent articles from one set from spilling into another of said sets or off said pan; said third section including a V-shaped channel having an endless belt in alignment with each pair of said corrugations; each of said pairs of corrugations feeding said articles to the channel and belt associated therewith whereby the aligned and oriented flow on each of said sets and in each of said channels is maintained relatively constant and equivalent to the remaining sets and channels.

18. The apparatus of claim 14 including a fourth section arranged rectilinearly with said third section and adapted to deposit said column of articles in an article packaging apparatus positioned adjacent the end of said fourth section; said fourth section including a plurality of channels thereon; each of said channels receiving one of said columns of articles from one of said channels and belts on said third section in a corresponding column in tandem arrangement thereon; and including an endless belt and means for maintaining said articles in a column in said tandem arrangement on said endless belt; means for supporting and driving said belts in closed paths; and means for selectively diverting and preventing said columns of articles from being deposited in such a packaging apparatus in response to a predetermined condition of said packaging apparatus; said fourth section being positioned at a level generally below said level of said third section such that said articles cascade from said third to said fourth section; said fourth section belt-supporting and driving means driving said belts at a speed faster than that of said third section whereby the linear spacing between said articles is further increased.

19. The apparatus of claim 14 wherein said V-shaped channel includes an endless belt having a V-shaped cross section; said supporting means including a V-shaped pan beneath said belt for maintaining the belt in its V-shaped configuration.

20. The apparatus of claim 1 wherein said receiving and holding means comprises a tank, said depositing means including at least one endless conveyor for lifting said articles from said tank; said support pan including at least four side-by-side parallel corrugations defining two pairs of discrete columns of flow; said lifting conveyor depositing said articles randomly on said four corrugations; said means for conveying said articles in tandem including at least two, parallel channels having generally V-shaped cross sections and endless conveyor belts supported in each of said channels, means for supporting said belts for movement in closed paths and means for causing the two columns of flow from each of said pairs of corrugations to merge into and be carried on the belt in one of said channels in a single column in which the articles are also maintained in a tandem arrangement.

21. The apparatus of claim 20 wherein said tank includes three of said lifting conveyors arranged parallel and side by side with one another; said support pan including three sets of corrugations; dividing means for dividing said sets of corrugations on said pan from one another and for preventing articles lifted and deposited in one of said sets of corrugations on said pan by one of said lifting conveyors from spilling over into another of said sets of corrugations; each of said sets including at least two pairs of said parallel corrugations; said means for conveying said a articles in tandem including one of said V-shaped channels with an endless conveyor belt for each of said pairs of parallel corrugations and means for causing the two columns of flow from each of said pairs to merge into a single column on the conveyor belt in one of said V-shaped channels whereby the aligned and oriented flow of articles along each of said sets and on each of said V-belts is maintained relatively constant and equivalent.

* * * * *